June 20, 1939. H. DESCHERE 2,163,272
ILLUMINATION
Filed Sept. 15, 1934 3 Sheets-Sheet 1
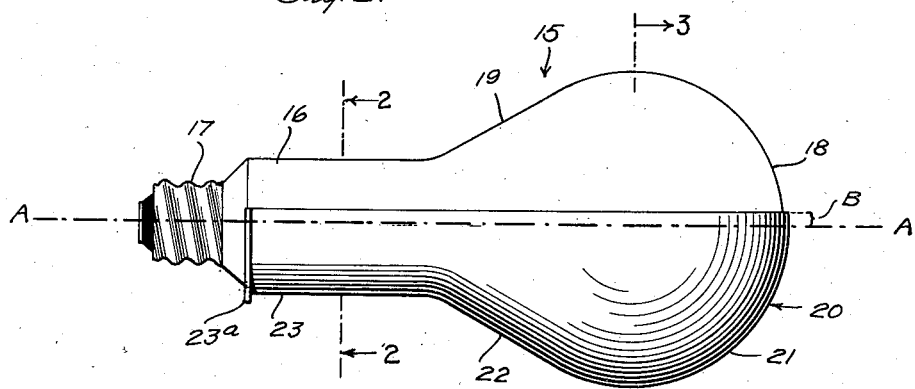
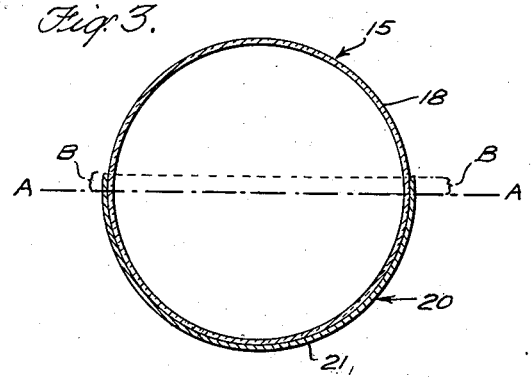
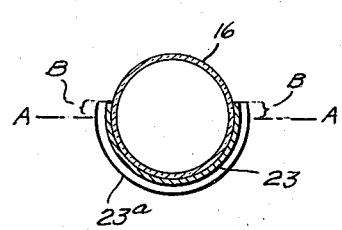
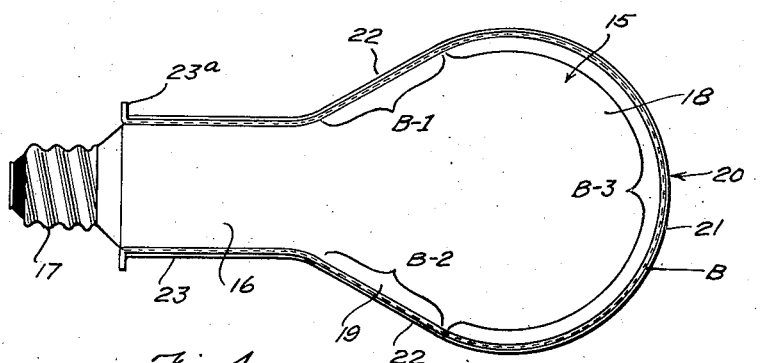
INVENTOR
HARVEY DESCHERE
BY
Blair, Curtis & Dunne
ATTORNEYS June 20, 1939.       H. DESCHERE       2,163,272
ILLUMINATION
Filed Sept. 15, 1934       3 Sheets-Sheet 2
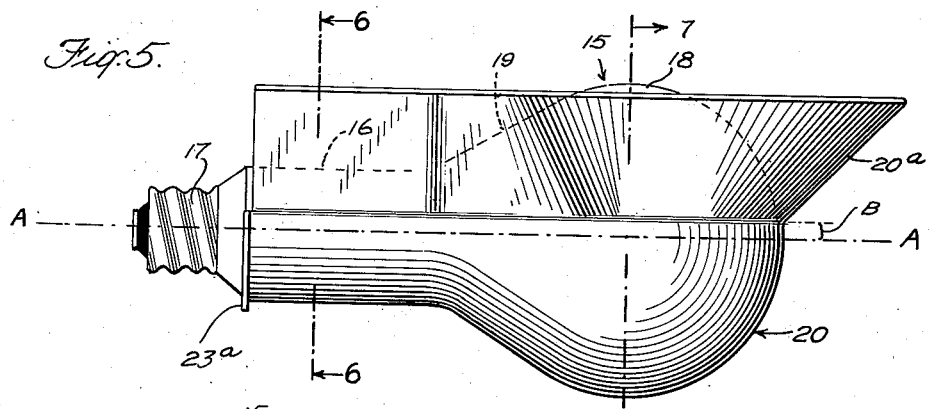
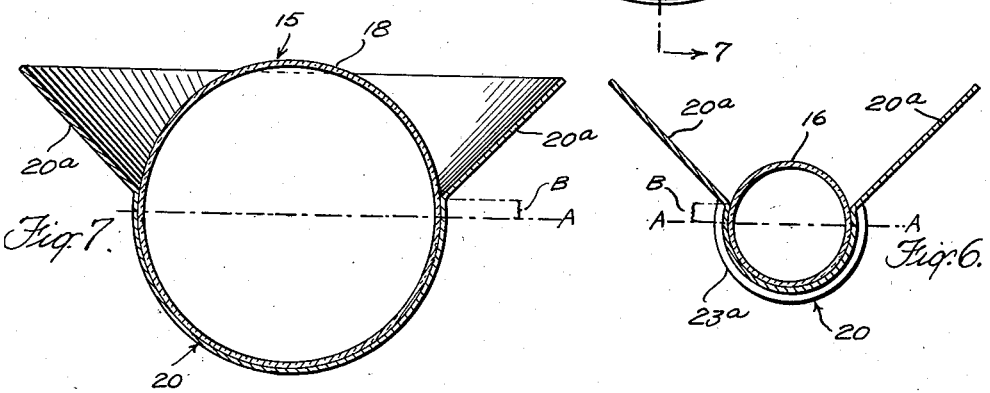
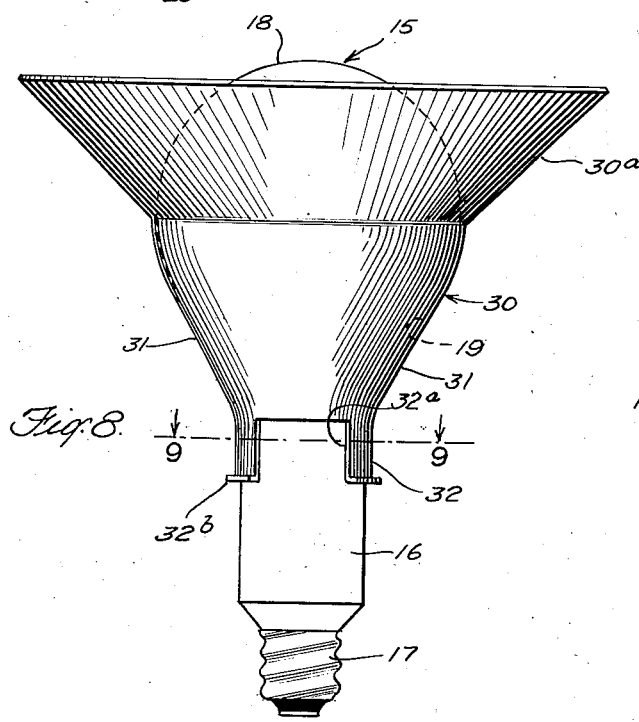
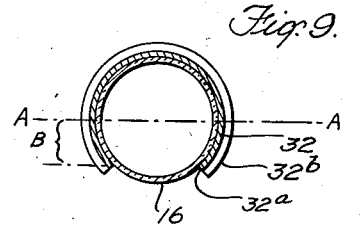
INVENTOR
HARVEY DESCHERE
BY
Blair, Curtis & Dunne
ATTORNEYS June 20, 1939.   H. DESCHERE   2,163,272
ILLUMINATION
Filed Sept. 15, 1934   3 Sheets-Sheet 3
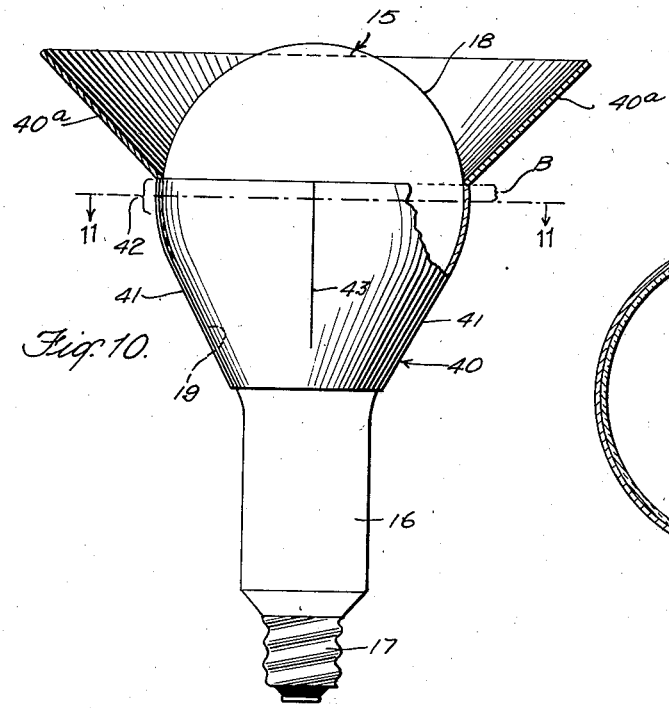
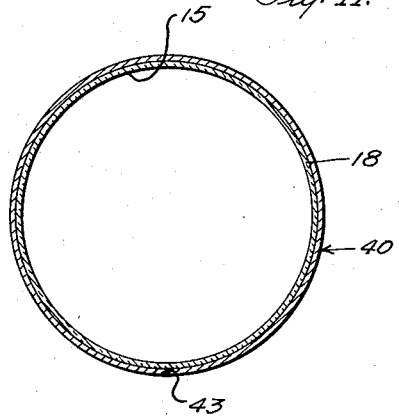
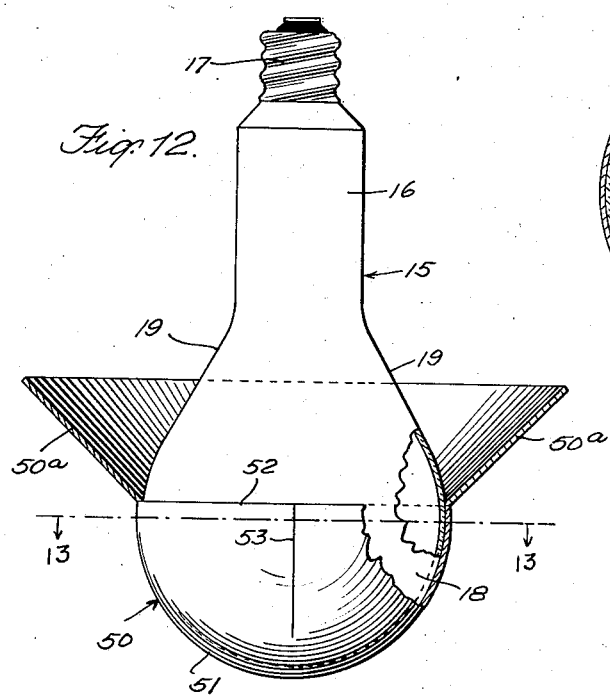
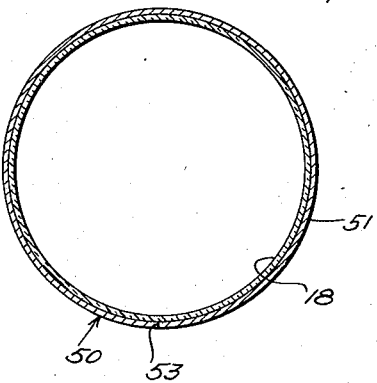
INVENTOR
HARVEY DESCHERE
BY
Blair, Curtis & Dunne
ATTORNEY Patented June 20, 1939

2,163,272

UNITED STATES PATENT OFFICE 2,163,272

ILLUMINATION

Harvey Deschere, New York, N. Y., assignor to Julian B. Beaty, Rye, N. Y.

Application September 15, 1934, Serial No. 744,141

4 Claims. (Cl. 240—103)

This invention relates to illumination and more particularly to the control of light emitted by an incandescent lamp bulb.

One of the objects of this invention is to provide a practical and inexpensive illuminating unit which will be efficient in action and thoroughly dependable in practical use. Another object is to provide a construction of this character that will be well adapted to meet the various peculiar requirements of practical use, such as, for example, simplicity of assembly or disassembly, dependable exclusion of dirt, dust, or other foreign matter, compactness and absence of mechanical complication and of bulk, lightness of weight, durability, efficient light or optical action, and the like. Another object is to provide a construction of the above-mentioned character that will be inexpensive to manufacture. Other objects will be in part obvious or in part pointed out hereinafter.

The invention accordingly consists in the features of construction, combinations of elements, and arrangements of parts which will be exemplified in the structure hereinafter described and the scope of the application of which will be indicated in the following claims.

In the accompanying drawings in which are shown several of the various possible embodiments of this invention, Figure 1 is a side elevation of one form of illuminating unit, and Figures 2 and 3 are vertical sectional views, as seen respectively along the lines 2—2 and 3—3 of Figure 1;

Figure 4 is a plan view, as seen from above in Figure 1;

Figure 5 is a side elevation of a modified form of unit like that of Figures 1-4;

Figures 6 and 7 are respectively vertical sectional views, as seen along the lines 6—6 and 7—7 of Figure 5;

Figure 8 is a side elevation showing another embodiment of certain features of my invention, and Figure 9 is a horizontal sectional view along the line 9—9 of Figure 8;

Figure 10 is a side view of another embodiment of certain features of my invention, certain parts being broken away and shown in section;

Figure 11 is a sectional view along the line 11—11 of Figure 10;

Figure 12 is a side elevation of another embodiment of certain features of my invention, and Figure 13 is a sectional view, as seen along the line 13—13 of Figure 12.

Similar reference characters refer to similar parts throughout the several views in the drawings.

Referring now to the drawings and first to Figure 1, I have shown an incandescent lamp bulb generally indicated at 15 and illustratively taking a standard form or shape, having, therefore, a narrow cylindrical neck portion 16 to which is related the threaded part 17 by which the lamp is secured into a suitable socket, and a generally hemispherical end portion 18 joined to the cylindrical portion 16 by a frusto-conical portion 19. Any suitable form of lamp source, such as a filament (not shown) which may be made incandescent when energized by a suitable current, is mounted in any suitable manner within the bulb 15.

The above-described bulb is to form part of my illuminating unit; the other part, for controlling the light emitted from the bulb or light source is what may generally be termed a reflector and is generally indicated at 20, being preferably made of a suitable sheet metal, such as soft aluminum. As will presently appear, it is shaped snugly to mate with so much of the exterior surface of the bulb 15 as includes all of that half of the bulb 15 that extends to one side (below) of the horizontal plane A—A (Figure 1) extending through the central longitudinal axis with which the axes of the bulb portions 18, 15 and 16 are coincident, plus a sufficient band-like portion of the surface of the bulb 15 above this vertical plane A—A, this band-like portion being indicated at B in Figure 1.

The reflector 20 therefore has a fragmentary spherical portion 21, a fragmentary frusto-conical portion 22, and a fragmentary cylindrical portion 23 mating respectively with the correspondingly curved or shaped surfaces of the bulb portions 18, 19 and 16.

However, each of these reflector portions, when seen in transverse section, as in Figures 2 and 3, for example, has the shape of an arc of a circle greater than 180° and sufficiently so that the above-described band portion B extends to the other side of the plane A—A and hence to the other side of the maximum diameter of that particular portion of the bulb 15, thereby preventing the reflector 20 from dropping off of the bulb 15, the material of the reflector 20 being sufficiently spring-like or yieldable to permit the arms of the generally U-shaped cross-sections to yield away from each other upon attaching or detaching the reflector relative to the bulb 15.

Furthermore, and as is better seen in Figure 4, the band portions B of the reflector portions 22 and 21 form what is in general the shape of a U, also springy or yieldable, and yieldably clamp, between the arms B—1, B—2 and the portion B—3 of the band B (Figure 4) the portions 18—19 of the bulb, thus dependably holding the reflector 20 against displacement in a direction toward the right or left, as viewed in Figure 1 or 4, relative to the bulb 15.

With this arrangement, the inherent springiness in the material of the reflector 20 causes the latter snugly and uniformly to hug the exterior surface of the bulb 15, making accessibility of dirt or foreign matter therebetween virtually impossible, and thus precluding such foreign matter from affecting the light-controlling action of the reflector 20; the latter has its inside surface suitably formed or treated to give the desired light-controlling action, illustratively a general reflecting action.

The reflector 20 and bulb 15 are assembled by simply bringing the one into or onto the other, so as to cause the portions B virtually to snap over and beyond the major diameter of the particular portion of the bulb; the spring action of the reflector itself not only holds the parts of the resultant unit in assembled relation but also, because of the shapes of the bulb surfaces with which the portions B of the reflector grip the former, constantly act to draw or wedge the parts into snug nesting relation. This same action insures the sealing, against entry of foreign matter, of the junction between the contacting faces of the band portions B and of the bulb itself.

To remove the reflector 20, it need merely be grasped by the hand and the yielding gripping action above described overcome by applying manually a sufficient force to separate the two parts.

Under certain circumstances of practical application, the light-controlling action of the reflector 20 of the unit of Figure 1 may be varied or augmented as by a peripherally extending portion 20ª (see now Figure 5) outwardly and upwardly inclined at any desired angle or angles and preferably integrally formed as an extension of the above-described band portion B of the reflector 20, resulting in the structure shown in Figures 5, 6 and 7.

The mechanical interactions between the parts 15 and 20—20ª of the unit of Figures 5, 6 and 7 is substantially like that already above described with respect to the unit of Figures 1-4, but it may be noted that the portion 20ª, particularly where it is integrally formed with the reflector 20, may be used as convenient handles, as it were, for opening up or separating the gripping portions of the reflector 20 to cause the latter to pass over the major diameters of the bulb 15, when it is desired to assemble or disassemble the unit. Furthermore, the portion 20ª, making an angle with the band portion B, acts, as a result of this angular relation, as a reinforcement which gives a greater gripping action to the portions B—1, B—2 and B—3 (see Figure 4) of the band portion B of the reflector.

Under certain circumstances of practical requirements, it is necessary to control the light from the bulb 15 somewhat differently. For example, where, in Figures 1-7, the light of the light source is cast to one side of the plane A—A through the longitudinal axis of the bulb 15, it may be necessary to cast the light in the general direction of that axis. In Figure 8 I have shown the bulb 15 with its axis extending vertically and completing that unit is a reflector generally indicated at 30 having a frusto-conical portion 31 mating with and snugly fitting the outer face of the frusto-conical portion 19 of the bulb 15, and having a portion 32 which extends about the cylindrical portion 16 of the bulb 15 to an extent greater than 180° (see Figure 9), providing band portions B (Figure 9) which extend over and beyond the major diameter of the cylindrical portion 16 and which, due to the above-described spring action of the material of the reflector 30, grip that portion of the bulb not only between themselves but also against that part of the cylindrical portion 32 of the reflector 30 that extends to the other side of that major diameter.

The portion 32 (Figure 8) of the reflector 30 may be given the above-described shape and action by forming it into a complete cylinder and removing therefrom a portion less than 180°, leaving a gap 32ª, as indicated in Figure 8.

If desired, the portion 32 may be provided with a peripherally extending flange 32ᵇ (Figures 8 and 9) extending at an appropriate angle, such as 90°, thereby to reinforce and stiffen the spring or yielding action in accordance with which the portion 32, tending to contract, grips the bulb portion 16.

The portion 16 of the bulb is thus securely gripped and the frusto-conical parts 31 and 19 are held in snug nesting position, precluding entry therebetween of foreign material. The light is directed upwardly, as viewed in Figure 8, and the portion 31 of the reflector may or may not, as desired, be provided with an extension 30ª which may or may not be integrally formed therewith, as desired.

In Figure 10 I provide another embodiment of certain features of my invention for directing the light rays in a direction lengthwise of the bulb axis and away from the bulb support; here the reflector 40, made of materials like that above-described, has a frusto-conical portion 41 snugly hugging the frusto-conical portion 19 of the bulb 15 and at its upper end, as seen in Figure 10, it has a portion 42 which is a segment of a sphere, and forms virtually a band portion (like the above-described band portions B) that extends beyond (upwardly in Figure 10) the major diameter of the hemispherical and frusto-conical portions 15 and 19 of the bulb.

In the side of the reflector 40 and extending downwardly from its upper peripheral edge, I provide preferably only one slit 43 (see also Figure 11) and preferably extend the slit downwardly throughout a substantial extent, as indicated in Figure 10.

In horizontal cross-section (see Figure 11) the upper portions of the reflector 40, and which extend to each side of the major diameter of the bulb 15, are thus made yieldable, and the mouth or upper end of the reflector 40, of less diameter than the maximum diameter of the bulb 15, may thus be expanded to slip the reflector 40 into or out of assembled relation to the bulb 15. The inherent yielding or spring action of the material of the reflector 40 permits the enlargement of the diameter thereof and the widening of the slit 43 as the mouth of the reflector passes over the major diameter of the bulb; this yielding action, moreover, is made strong and reliable for the most effective gripping portions (the ribbon or band 42 of Figure 10) is comprised of two parts at an angle to each other, a part that is above the plane of the maximum circumference of the bulb 15 and leans inwardly against the spherical portion 15, and a part below that maximum circumference which also leans inwardly and which hugs the frusto-conical portion 19 of the bulb. Thus, entry of foreign matter between the reflector and bulb is precluded, the upper periphery of the former dependably hugging the latter and sealing the junction against ingress of foreign matter.

If desired, the upper portion of reflector 40 may be provided with an extension 40ᵃ (Figure 10) of suitable curvature of angle or shape and that may, as desired, be formed integrally with the reflector 40, in which case the slit 43 extends through the extension 40ᵃ, or it may simply rest, as shown, upon the upper peripheral part of the reflector 40 or be secured thereto in any desired manner.

There are, however, occasions when the light from the bulb 15 is to be directed along the axis but in the general direction toward the bulb support; in such case, certain features of my invention may be embodied in a form like that shown in Figures 12 and 13. Here the reflector 50, again preferably of sheet metal, includes a hemispherical portion 51 which snugly fits about the hemispherical part 18 of the bulb but is extended upwardly beyond the major diameter of the latter where it is inclined inwardly to hug the lower part of the frusto-conical portion 19 of the bulb, thus forming a band-like portion 52 (not unlike the portion 42 of Figure 11) again made up of two parts making an obtuse angle with each other, one part extending above the major diameter of the bulb, and the other below the major diameter of the bulb.

Yieldable expansibility of this portion 52 of the reflector 50 I make possible by providing preferably only one slit 53 (Figures 12 and 13) extending from the mouth of the reflector 50 downwardly for a substantial distance, like that suggested in Figure 12. Accordingly, the mouth of reflector 50, normally, under the spring action of less diameter than the major diameter of the bulb, and normally keeping the slit 53 closed, may be enlarged to pass over the major diameter of the bulb as the reflector 50 is slipped onto or off of the bulb 19. Here dependable spring action is achieved not only by the angular parts of the portion 52, as above described, but also by the cross-sectional curvature or concavity of the portions of the reflector 50 to either side of the slit 53.

With this construction, the light, where the reflector 50 is opaque as is the case when it is made of metal, is directed in a general upward direction and this action may be supplemented by the provision of an extension 50ᵃ of suitable angle or curvature, preferably frusto-conical, integrally formed with the reflector 50, in which case the slit 53 extends through the extension 50ᵃ, or the latter may be attached to part 50 in any desired manner, or may even simply rest upon the upper periphery of the reflector 50.

Thus, I am enabled to achieve the various objects above-mentioned and to achieve also many thoroughly practical advantages. In each instance I am enabled to avoid the complexities, expense and other disadvantages of separate securing devices, and I am enabled to achieve the manifold advantages of a one-piece construction. Freedom from unsightly and dirt-collecting projecting parts and neatness of appearance are achieved. The replacement of the bulb portion of the unit is easily and quickly accomplished, when necessary to replenish defective or burned out bulbs, and of great importance is the feature whereby the junctions between bulb and reflector are sealed against ingress of foreign matter but sealed in a simple, inexpensive and dependable manner. Moreover, the constructions are of a character that lend themselves to inexpensive fabrication, particularly out of sheet metal, an illustrative and preferred metal being relatively soft aluminum which, with the shapes, angled parts, or curvatures above described, produce excellent results in achieving the various yielding or spring and other actions above described.

Moreover, the construction lends itself readily to meeting the various conditions met with in practice; for example, depending upon various factors, the spring action most appropriate for gripping the particular part of the bulb may be easily and quickly suited to meet the conditions in question by, for example, appropriate selection of the material of the sheet of which the reflector is formed in coaction with the particular curvatures that are provided to snugly hug the particular portion of the bulb, but this action I may vary by varying the thickness of the material or by improving the spring action by giving the particular spring or yielding portion an appropriate cross-sectional shape, as, for example, is achieved by the angled relation between the portion 32 and the flange 32ᵇ of Figures 8 and 9. In similar manner, I may provide the portions 23 of the reflector of Figures 1–7 with a similar flange 23ᵃ (see Figures 1 and 2, and Figures 5 and 6). A similar control or predetermination of the spring action of the yieldable portion is achieved in the constructions of Figures 10 and 12, as already above described. Accordingly, thoroughly dependable maintenance of assembly of the two parts of the illuminating unit may be brought about even under the severest requirements met with in practice.

As many possible embodiments may be made of the above invention and as many changes might be made in the embodiment above set forth, it is to be understood that all matter hereinbefore set forth or shown in the accompanying drawings, is to be interpreted as illustrative and not in a limiting sense.

I claim:

1. In construction of the character described, in combination, a light bulb having a cylindrical glass part of substantial length and in the axis of which is the source of light and a light-controlling member made of a single piece of sheet material having spring qualities and curved about an axis parallel to said first-mentioned axis and being closely fitted to said cylindrical part throughout sufficiently more than 180° of the latter to provide opposed substantially straight-lined ends that are parallel to each other and to said axis about which said sheet material is curved, forming a mouth bounded only by two straight-lined ends between which said cylindrical glass part is movable in a direction to maintain its axis and said axis of curvature parallel and which may yield away from each other under the spring action of the material and respectively in directions away from said axes to pass over or to pass therebetween, upon relative movement of said bulb and member in a direction to bring said two axes toward each other, the major diameter of said cylindrical part, the spacing between said parallel straight-lined ends of said mouth, after said glass part and said light-controlling member are assembled as aforesaid, being substantial and on the order to expose therebetween somewhat less than 180° of said cylindrical glass part.

2. In construction of the character described, in combination, a light bulb having a cylindrical glass part in the axis of which is the source of light and a light-controlling member made of a single piece of sheet material having spring qualities and curved about an axis parallel to said first-mentioned axis and being closely fitted to said cylindrical part throughout sufficiently more than 180° of the latter to provide opposed substantially straight-lined ends which may yield away from each other under the spring action of the material and respectively in directions away from said axes to pass over or to pass therebetween, upon relative movement of said bulb and member in a direction to bring said two axes toward each other, the major diameter of said cylindrical part, said light-controlling member having light-controlling extensions along its said straight-lined edges at an angle to the tangent to said cylindrical part of the bulb at the line of termination of the light-controlling member along said cylindrical part.

3. In construction of the character described, in combination, a light bulb having a frusto-conical portion terminating in one end at a hemispherical portion and at the other end in a cylindrical portion, the axes of said frusto-conical portion and of said cylindrical portion being coincident and the center of said hemispherical portion falling in said coincident axes, and through all of which portions light is emitted, and a light-controlling reflector made of a single piece of sheet metal shaped to conform accurately and snugly to all of said bulb portions that are to one side of a plane through said coincident axes and hence having an arcuate cross-section of 180°, said sheet metal reflector having, as the sole means for holding it assembled to said bulb, a continuous band-like internally concave extension beyond said plane so that its cross-section in any plane transverse to said coincident axes is several degrees greater than 180°, the internal concavity of said band portion closely matching the convexity of the bulb portions it engages to grip the latter and to substantially exclude the passage of dust between it and said bulb portions, said sheet metal reflector having, by reason of its aforesaid cross-section, an inherent resiliency or springiness to permit it to spread apart and away from a plane that passes through said coincident axes and that is at right angles to said first-mentioned plane, thereby to permit parts including the largest diametered parts of said three bulb portions to pass into said reflector and to permit said reflector thereafter as a whole to grip said bulb and hold itself assembled thereto, said inherent springiness also causing said internally concaved band-like extension to closely hug and interfit with the adjacent bulb portions to effect gripping and dust exclusion as aforesaid.

4. In construction of the character described, in combination, a light bulb having a frusto-conical portion terminating in one end at a hemispherical portion and at the other end in a cylindrical portion, the axes of said frusto-conical portion and of said cylindrical portion being coincident and the center of said hemispherical portion falling in said coincident axes, and through all of which portions light is emitted, and a light-controlling reflector made of a single piece of sheet metal shaped to conform accurately and snugly to all of said bulb portions that are to one side of a plane through said coincident axes and hence having an arcuate cross-section of 180°, said sheet metal reflector having a continuous extension beyond said plane so that its cross-section in any plane transverse to said coincident axes is several degrees greater than 180° and snugly engages said bulb portions, said sheet metal reflector having, by reason of its aforesaid cross-section, an inherent resiliency or springiness to permit it to spread apart and away from a plane that passes through said coincident axes and that is at right angles to said first-mentioned plane, thereby to permit parts including the largest diametered parts of said three bulb portions to pass into said reflector and to permit said reflector thereafter as a whole to grip said bulb and hold itself assembled thereto, said continuous extension part of said reflector having flange means along its edge that extend at such an angle to said first-mentioned plane as to additionally reflect light in the general direction of reflection thereof by said reflector.

HARVEY DESCHERE.